Oct. 1, 1957       P. T. LA LONDE       2,808,160

VEHICLE HOISTING AND TOWING DOLLY

Filed Aug. 23, 1954

PETER T. LA LONDE
*INVENTOR.*

BY *Loyal H. McCarthy*
ATTORNEY.

United States Patent Office 2,808,160
Patented Oct. 1, 1957

2,808,160

VEHICLE HOISTING AND TOWING DOLLY

Peter T. La Londe, Portland, Oreg.

Application August 23, 1954, Serial No. 451,348

5 Claims. (Cl. 214—86)

My device relates to mechanical means for hoisting, dislodging and towing disabled motor vehicles without the necessity of employing a specialized truck.

One object of my invention is to provide a device for hoisting, dislodging and towing which is practical and relatively inexpensive.

Another object of my invention is to provide a device for hoisting, dislodging and towing disabled vehicles which can be readily used in conjunction with a passenger car, pickup or truck of any body model without the necessity of having a specialized truck for that purpose.

Still another object of my invention is to provide a device for hoisting, dislodging and towing disabled vehicles which will enable a disabled vehicle to be rigidly and positively secured with a minimum of danger from jerking, rocking, ramming or swaying.

A further object of my invention is to provide a device for towing, dislodging or hoisting disabled vehicles which is simple, compact and which can be pulled by any motor vehicle as if it were an ordinary trailer.

A still further object is to provide a trailer vehicle which will perform substantially all the operations of a towing truck such as pulling vehicles out of ditches or over embankments.

Referring to the drawings.

Figure 1:
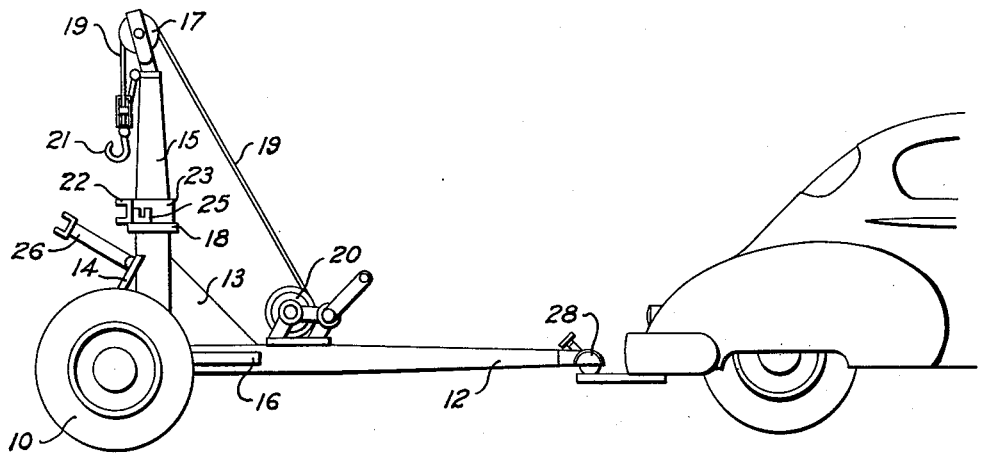
Fig. 1 is a side elevational view of my hoisting and towing dolly hitched to a passenger car.
Figure 2:
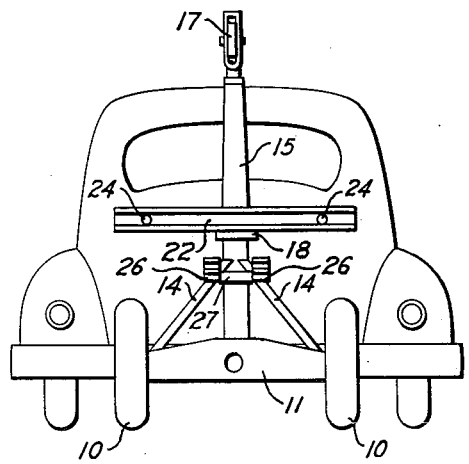
Fig. 2 is an elevational view from the rear of the hoisting and towing dolly while hitched to a passenger car.

Referring further to the drawings:

The wheels 10 of the dolly are standard automobile wheels spaced by the frame 11 to a substantially narrower track than that of the conventional motor vehicle or passenger car. A tongue 12 is permanently secured to the front surface of the frame 11 midway between the wheels 10 in such a manner that the upper surface of the tongue 12 is flush with the top surface of the frame 11. The tongue 12 is secured to the frame 11 by welding or any other suitable means. Brace member 13 is positioned at the front surface of the mast 15 and extends forwardly along the tongue 12. Rear brace members 14 are positioned between the ends of the frame 11 and the back portion of the mast 15, one brace 14 running from each end of the frame 11 to the mast 15. Brace members 16 are positioned between the ends of the frame 11 and the tongue 12, one brace 16 running from each end of the frame 11 to the side of the tongue 12. The vehicle support mast 15 is rigidly secured to the frame 11 and the tongue 12 by welding or any other suitable means and so positioned thereon as to be substantially forward of the axis line through the wheels 10. A pulley 17 is positioned on the uppermost end of the mast 15. A flange 18 circumscribing the mast 15 is permanently secured by welding or any other suitable means substantially at the mid point of said mast 15. A hoisting cable 19 is motivated by a manual winch 20 which is positioned on the tongue 12 forwardly of the mast 15 and the brace member 13. The winch 20 may be replaced by any other known and suitable hoisting means, including hydraulic or automatic mechanisms. A hook and block device 21 is operable by the winch 20 through the medium of said hoisting cable 19. A towing and support bar 22, fabricated preferably from channel iron or angle iron stock, is provided with a seamless tubular collar 23 as an integral part thereof. A hole 23a passes vertically through the collar 23. 23a is complementary to and fits around the mast 15 immediately above the flange 18, thereby enabling the collar 23 and the towing and support bar 22 to rotate freely around the mast 15. The towing and support bar 22 and the collar 23 are maintained at the predetermined height on the mast 15 by the said fixed flange 18. The towing and support bar 22 is provided with a hole 24 near each end through the vertical face thereof. On the back side of the vertical face of the towing and support bar 22 between the holes 24 and the collar 23 are positioned locking shoulders 25, each locking shoulder 25 being provided with a notch 25a. The notches 25a are preferably positioned at the top edge of the locking shoulders 25 and are recessed downwardly therefrom a suitable distance to accommodate securing chain 29. Clearance lowering bars 26 are mounted so as to pivot rearwardly or upwardly upon a horizontal axis by a pivotal bearing 27 positioned on the rear surface of the mast 15 between the flange 18 and the frame 11. The forward end of the tongue 12 is equipped with a suitable trailer hitch 28 of standard make or design for fastening the hoisting and towing dolly to a passenger car, pickup or other vehicle equipped with a complementary portion of said hitch. Securing chains 29 are employed to fasten the disabled vehicle rigidly to the towing and support bar 22 by means of the holes 24, the locking shoulders 25 and the notches 25a after the disabled vehicle has been hoisted to the level of said towing and support bar. A hoisting chain 30 is fastened to the bumper 31 or other available portion of the disabled vehicle, the said chain 30 being then engaged upon the hook and block device 21. The chains 29 and 30 are conventional link chains of suitable dimensions and strength.

Figure 3:
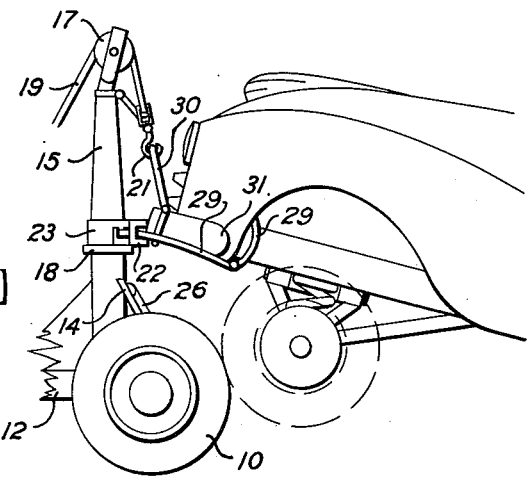
Fig. 3 is a side elevational view of the hoisting and towing dolly with a disabled vehicle secured in place for towing.
Figure 4:
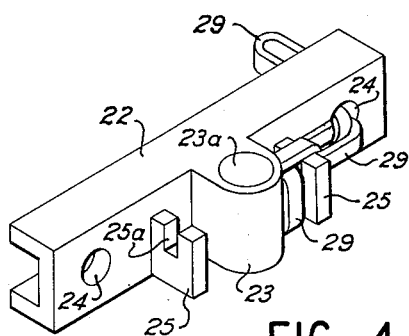
Fig. 4 is a three dimensional view of the towing and support bar, showing the manner in which the securing chain is fastened on said bar.

The towing and hoisting dolly in picking up a disabled vehicle may be backed up to said vehicle either straight on or at an angle from the front or the rear of the disabled vehicle, whichever position is most advantageous in the particular situation at hand. After the hoisting and towing dolly has been maneuvered into the desired position the towing and support bar 22 is rotated on the upright mast 15 until it is parallel to the front or rear of the disabled vehicle. The hoisting chain 30 is then secured upon some suitable portion of the disabled vehicle, such as the bumper 31, and engaged with the hook of the hook and block device 21. By actuating the winch 20, or other hoisting mechanism, the subject vehicle will be drawn in closer to the dolly and then raised up or will be immediately raised up, depending on its distance from the dolly. After the subject vehicle has been brought to the proper height with respect to the towing and support bar 22, it is secured to said towing and support bar by means of securing chains 29. The chains 29 are fastened to the frame or some other suitable portion of the subject vehicle, passed through the holes 24 near each end of towing and support bar 22, pulled up as snugly as possible and slipped into the notches 25a of the locking shoulders 25, as best shown by Figs. 3 and 4 of the drawings.

The link of the chain which is engaged in the notch 25a must be inserted edgewise. This securely locks the chain 29 against slipping by means of the next link which cannot pull through the notch 25a by reason of its being offset from the link engaged in said notch 25a. The disabled vehicle is now secured for towing which can be accomplished at relatively high speeds with no danger from jerking, rocking, ramming or swaying by the towed vehicle while traveling or while suddenly accelerating or braking. If desired, the hook and block device 21 may be left engaged upon the hoisting chain 30 as an added precautionary measure during the towing process although it is not necessary to the safe operation of the hoisting and towing dolly.

When the disabled vehicle has been towed to its destination and is ready for unloading, the tension is first taken off the towing and support bar 22 and the securing chains 29 by hoisting the vehicle slightly through the operation and cooperation of the hoisting chain 30, the hook and block device 21, the hoisting cable 19 and the winch 20. The clearance lowering bars 26 are engaged against some suitable portion of the vehicle, such as the bumper or frame cross member, after having removed the securing chains 29 from the locking shoulders 25 and the towing and support bar 22. As the vehicle is lowered through the operation of the winch 20, the clearance lowering bars 26, being pivotally mounted upon a horizontal bearing thus causing said clearance lowering bars to move upwardly or downwardly along a predetermined path, will force the subject vehicle backwards sufficiently to clear the wheels of the hoisting and towing dolly in depositing said vehicle on the ground. In the hoisting operation no clearance problem is encountered due to the relative positions of the subject vehicle and the hoisting and towing dolly and the direction of pull exerted upon the hoisting chain 30. However, after the vehicle has been secured to the towing and support bar 22 its position is directly above the wheels 10 of the hoisting and towing dolly, or substantially so. In lowering the vehicle from this position it would come down upon the wheels of the dolly if the clearance lowering bars 26 were not engaged before commencing the lowering operation.

It is apparent from the drawings and description herein that other embodiments of my invention are practical without departing from the spirit thereof. While the disclosure made herein is a preferred form of my invention, it is understood that I am not limiting myself hereby to this particular embodiment.

Having thus described by invention, what I claim is:

1. In a hoisting and towing dolly for vehicles: standard automobile wheels; a frame structure, spacing said wheels to a track narrower than that of a conventional motor vehicle; a tongue secured to said frame structure between said wheels; a mast secured to said frame structure and said tongue substantially forward of the axis line of said wheels; a pulley on the upper end of said mast; a hoisting mechanism; a hoisting cable operable through said pulley motivated by said hoisting mechanism; a hook and block device actuated by said hoisting cable and hoisting mechanism; a flange fixed medially of said mast; a towing and support bar having a collar integral therewith and having a hole near each of its ends, said collar being provided with a hole complementary to said mast pivotally mounting said collar and towing and support bar immediately above the flange fixed medially of said mast; a locking shoulder with a notch recessed therein between said holes near the ends of the towing and support bar and said integral collar; conventional link securing chains engageable in said recessed notches in the locking shoulders on said towing and support bar; and clearance lowering bars pivotally mounted on the mast, said clearance lowering bars engaging a disabled vehicle and maintaining a predetermined path during lowering of the vehicle.

2. In a hoisting and towing dolly for vehicles: standard wheels; a frame structure, spacing said wheels to track narrower than a conventional motor vehicle; a tongue; an upright mast; a towing and support bar with a hole near each end thereof and with integral supporting means medially thereof, said fixed supporting means pivotally mounting and attaching the towing bar to the vehicle supporting mast medially thereof; a locking shoulder containing a recessed notch spaced between each hole of the towing and support bar; clearance lowering bars pivotally mounted on the mast; hoisting cable and attaching means, adapted to elevate to and bring in contact with the towing and support bar for attachment some portion of the vehicle to be towed and selectively a manual winch or other hoisting mechanism.

3. In a hoisting and towing dolly for vehicles: standard automobile wheels; a frame structure, spacing said wheels to track narrower than conventional motor vehicles; a tongue secured to said frame structure; a supporting mast secured to said frame structure; a pulley on the upper end of said supporting mast; hoisting mechanism; a hoisting cable operable through said pulley motivated by said hoisting mechanism; a hook and block device activated by said hoisting cable and hoisting mechanism; support means fixed medially of said supporting mast; a towing and support bar having a collar integral therewith and having a hole near each of its ends, said collar having a hole complementary to said supporting means pivotally mounting said collar and towing and support bar immediately above said supporting means; a locking shoulder with a notch recessed therein between said holes, near the ends of the towing and support bar, and said integral collar; securing means engageable in said recessed notches in the locking shoulders on said towing and support bar; and clearance means movably mounted on the supporting mast and engageable with another vehicle, said means maintaining a predetermined path during lowering of the vehicle.

4. In a hoisting and towing dolly for vehicles: standard automobile wheels; a frame structure, spacing said wheels to track narrower than conventional motor vehicles; a tongue secured to said frame structure; a supporting mast secured to said frame structure; a pulley on the upper end of said supporting mast; hoisting mechanism; a hoisting cable operable through said pulley motivated by said hoisting mechanism; a hook and block device activated by said hoisting cable and hoisting mechanism; support means fixed medially of said supporting mast; a towing and support bar having a collar integral therewith and having a hole near each of its ends, said collar having a hole complementary to said supporting means pivotally mounting said collar and towing and support bar immediately above said supporting means; a locking shoulder with a notch recessed therein between said holes, near the ends of the towing and support bar, and said integral collar; securing means engageable in said recessed notches in the locking shoulders on said towing and support bar; and clearance means movably mounted on the supporting mast and engageable with another vehicle.

5. In a hoisting and towing dolly for disabled vehicles: standard wheels spaced to track narrower than a conventional motor vehicle; a tongue; an upright vehicle supporting mast positioned forward of the axis of said wheels; supporting means attached medially of the height of said upright mast; a towing and support bar with an integral collar operably mounted on said upright mast above said supporting means, said towing and support bar having a hole near each end thereof; a locking shoulder with a notch recessed therein between each of said holes and the operable connecting means on the back side of said towing and support bar; attachment means adapted to secure a disabled vehicle and cooperating with each locking shoulder and its adjacent hole of said towing and support bar; and a pivotally mounted clearance lowering bar engageable with a disabled vehicle in lowering said vehicle and attached to said upright mast between the base thereof and the towing and support bar.

(References on following page)

References Cited in the file of this patent

UNITED STATES PATENTS

| | | |
|---|---|---|
| 1,375,403 | McDermott | Apr. 19, 1921 |
| 1,402,074 | Kloehn | Jan. 3, 1922 |
| 1,805,402 | Johnson | May 12, 1931 |
| 2,497,379 | Vandergrift et al. | Feb. 14, 1950 |
| 2,553,229 | Barhorst | May 15, 1951 |
| 2,564,111 | Kimball | Aug. 14, 1951 |
| 2,582,153 | Ostrander | Jan. 8, 1952 |
| 2,661,106 | Morgan | Dec. 1, 1953 |
| 2,712,877 | Wiley | July 12, 1955 |

FOREIGN PATENTS

| | | |
|---|---|---|
| 455,401 | Great Britain | Oct. 20, 1936 |